Figure 1:
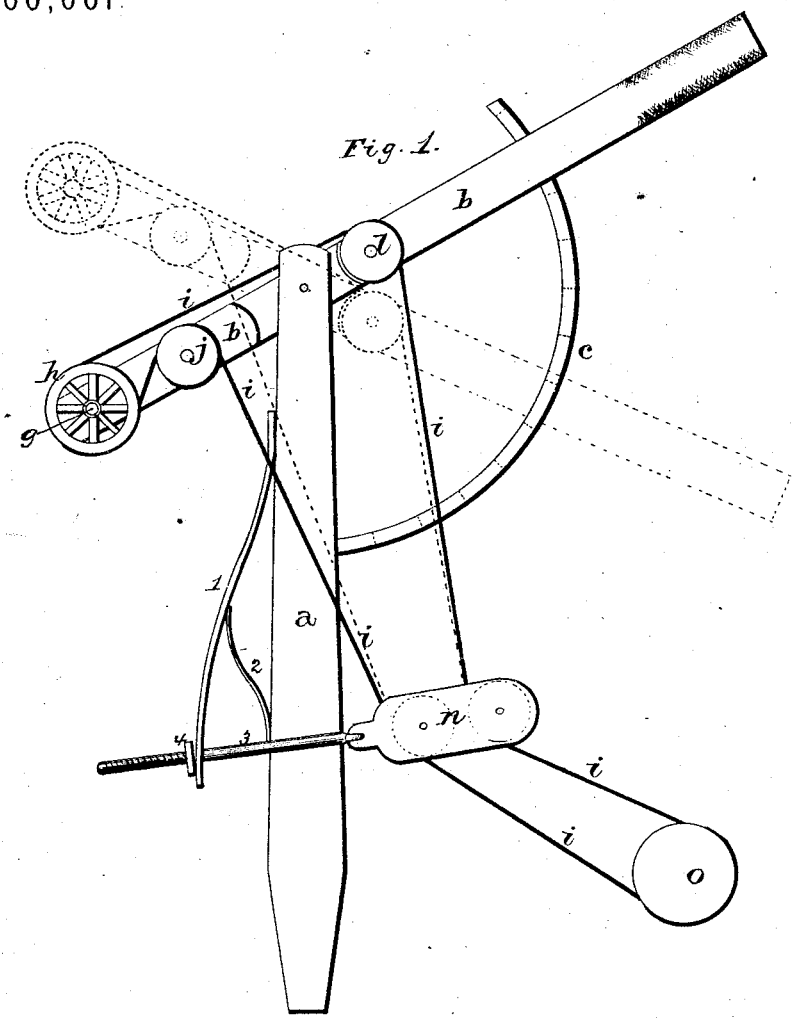
Figure 2:
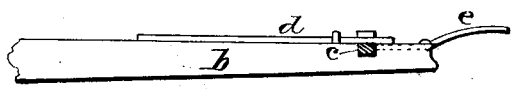

G. G. REED.
Harvester-Reel.

No. 160,061. Patented Feb. 23, 1875.

WITNESSES.
J. Wm. Garner,
F. A. Lehmann.

INVENTOR.
Geo. G. Reed
per
F. A. Lehmann,
Atty.

UNITED STATES PATENT OFFICE.

GEORGE G. READ, OF RUSSELLVILLE, KENTUCKY.

IMPROVEMENT IN HARVESTER-REELS.

Specification forming part of Letters Patent No. 160,061, dated February 23, 1875; application filed December 2, 1874.

*To all whom it may concern:*

Be it known that I, GEORGE G. READ, of Russellville, in the county of Logan and State of Kentucky, have invented certain new and useful Improvements in Reel-Posts for Harvesters; and I do hereby declare the following to be a full, clear, and exact description of the invention, such as will enable others skilled in the art to which it pertains to make and use it, reference being had to the accompanying drawings, which form a part of this specification.

My invention relates to an improvement in reel-posts for harvesters; and consists in a lever which is pivoted near its center to a suitable standard, and in the end of which lever is journaled the reel, the lever carrying the band-pulleys on opposite sides of the fulcrum, so that the reel can be raised or lowered at the will of the operator to suit the height of the grain that is being cut without the trouble of adjusting the chain or belt by which the reel is operated, as will be more fully described hereafter.

The accompanying drawing represents my invention.

$a$ represents a vertical standard, which is to be fastened to the sickle-bar, and which has a beam or lever, $b$, pivoted to its upper end. This lever has its ends of unequal length, in the shorter of which is journaled the reel, while the longer one forms a handle, by means of which the reel is to be raised or lowered. To the side of the standard $a$ is secured the curved ratchet-bar $c$, which extends upward through a notch in the side of the lever $b$, under the spring $d$, which spring catches in the notches in the bar, and thus holds the lever in any desired position. Pivoted to the side of lever $b$, so that it may be grasped by the hand in taking hold of the end of the lever, is a short lever, $e$, the inner end of which catches under the end of the spring, so as to raise it out of the notches, and thus allow the lever $b$ to be freely adjusted at the will of the driver. Upon the end of the reel-shaft $g$ which extends through the short end of the lever $b$ is placed the pulley $h$, which revolves with the reel, and which is operated by the endless belt or chain $i$. Journaled to the same side of the lever $b$ as the pulley $h$ are two other pulleys, $j\ l$, but upon opposite sides of the pivot of the lever, and over which the chain or belt also passes on its way to and from the driving-pulley $o$. By placing these pulleys upon opposite sides of the pivot, as one of them is raised or lowered the other is moved in an opposite direction, and thus the chain or belt is always held with nearly the same tension upon the pulley $h$, whether the reel is raised or lowered.

In order to take up any slack that may occur at any time in the belt or chain, it is passed through a tension device, $n$, such as is here shown, consisting of the two springs 1 2, screw-rod 3, and nut 4, or any other that may be preferred.

By means of the pivoted lever $b$, which extends to within easy reach of the driver, the reel can be quickly and easily adjusted to suit the height of any grain that is being cut.

I am aware that a lever pivoted to a vertical standard and carrying the reel is not new. My invention consists in placing the pulleys, over which the cord or chain passes, on the lever and on opposite sides of the fulcrums, instead of on the standard, so that the pulleys will change position with each movement of the lever.

Having thus described my invention, I claim—

The combination of the standard $a$, lever $b$, carrying the three pulleys $h\ j\ l$, and holding device, the pulleys $j\ l$ being arranged on different sides of the fulcrum of the lever, substantially as shown and described.

In testimony that I claim the foregoing I have hereunto set my hand this 19th day of November, 1874.

GEO. G. READ.

Witnesses:
W. M. DUNAVAN,
JNO. P. LONG.